United States Patent
Fukuda et al.

(10) Patent No.: US 6,587,287 B2
(45) Date of Patent: Jul. 1, 2003

(54) HYBRID OPTICAL MODULE

(75) Inventors: Shinnosuke Fukuda, Saitama (JP); Masaki Okayasu, Saitama (JP); Hirofumi Tanaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/749,678

(22) Filed: Dec. 28, 2000

(65) Prior Publication Data
US 2001/0040741 A1 Nov. 15, 2001

(30) Foreign Application Priority Data
Dec. 28, 1999 (JP) ............................ 11-375167

(51) Int. Cl.[7] .................................................. G02B 5/04
(52) U.S. Cl. ......................................... 359/833; 257/81
(58) Field of Search .......................... 359/831, 833; 348/76; 257/79, 80, 81, 84

(56) References Cited

U.S. PATENT DOCUMENTS

| | | | |
|---|---|---|---|
| 5,365,268 A | * 11/1994 | Minami | 348/76 |
| 5,418,765 A | 5/1995 | Misawa et al. | 369/44.12 |
| 5,867,469 A | 2/1999 | Tanaka et al. | 369/121 |
| 6,252,252 B1 | * 6/2001 | Kunii et al. | 257/81 |

FOREIGN PATENT DOCUMENTS

EP  0 706 175 A1  4/1996  ............ G11B/7/135

* cited by examiner

*Primary Examiner*—Euncha Cherry
(74) *Attorney, Agent, or Firm*—Sughrue Mion, PLLC

(57) ABSTRACT

A multilayer ceramic substrate 11 is used, and a prism 14 serving as a component of a hybrid optical module and a chip 12 on which an optoelectric converting element is mounted are mounted on different layers of the multilayer ceramic substrate. The thickness of the chip on which the optoelectric converting element is mounted is substantially equal to the depth of the layer of the multilayer ceramic substrate on which the chip is mounted.

1 Claim, 1 Drawing Sheet

HYBRID OPTICAL MODULE

BACKGROUND OF THE INVENTION

The present invention relates to a hybrid optical module in which components of an optical pickup, excluding an objective lens are integrated to one another so that the module is miniaturized.

Among devices constituting a CD player, an optical pickup which detects an optical signal is the heart of the CD player. With respect to such an optical pickup, requests for a reduced cost, a high reliability, and a reduced weight have been given. However, a conventional optical pickup which is configured by discrete components cannot meet such requests. Therefore, optical modules of a hybrid configuration which are called a hologram pickup or a laser coupler have begun to be used.

In such hybrid optical modules, particularly in a laser coupler, all parts other than an objective lens are integrated into one component, so as to extremely reduce the size of the module. Specifically, as shown in FIG. 2, a photo diode IC substrate 20 (silicon substrate) on which optoelectric converting elements 22 are formed is used as a base, and a prism and a laser diode 25 are mounted on the base, thereby configuring a laser coupler. The laser coupler is housed in a package which is not shown. An objective lens and mechanical parts such as an actuator are placed on the package to complete an optical pickup unit.

In the figure, the arrows indicate directions of incidence and emission of light. Light emitted from the laser diode 25 is incident on an end face of the prism 24 to change the direction by 90°, and then converged by an objective lens 26, on a signal plane of an optical disk which is not shown. The light is then reflected with being modulated in intensity by pits, and returns to the prism 24 via the objective lens 26. The optoelectric converting elements (OEICs) 22 detect the light to convert it into an electric signal.

Such a hybrid optical module is housed in a package of the resin type or the metal type. The former type is inferior in mechanical strength and heat resistance. The latter type has difficulties from the viewpoint of a production process, and features which are opposite to requests for reduction in size and weight. In both the types, the above-mentioned hybrid optical module requires the silicon substrate 20 in order to mount the prism 24 and enable the optoelectric converting elements 22 to obtain information of the disk plane. This causes the production cost to be increased.

SUMMARY OF THE INVENTION

The invention has been conducted in view of the above-discussed circumstances. It is an object of the invention to provide a hybrid optical module in which a multilayer ceramic substrate is used as the above-mentioned package, a prism serving as a component of an optical pickup unit and a chip on which an optoelectric converting element is mounted are mounted on different layers of the multilayer ceramic substrate to reduce the production cost, and the thickness of the chip on which the optoelectric converting element is mounted is substantially equal to the depth of an arbitrary layer of the multilayer ceramic substrate on which the chip is mounted, whereby wire bonding is facilitated to enhance the workability.

In order to solve the problems discussed above, the hybrid optical module according to a first aspect of the invention is characterized in that a prism which controls incidence and emission angles of light is directly mounted on a multilayer ceramic substrate on which an optoelectric converting element is mounted.

The hybrid optical module according to a second aspect of the invention is characterized in that, in the hybrid optical module according to the first aspect of the invention, the optoelectric converting element is mounted in such a manner that a thickness of the optoelectric converting element itself is substantially equal to a depth of an arbitrary layer of the multilayer ceramic substrate on which the optoelectric converting element is mounted, and the optoelectric converting element is wire-bonded to the arbitrary layer.

According to this configuration, the prism serving as a component of an optical pickup unit and the chip on which an optoelectric converting element is mounted are mounted on different layers of the multilayer ceramic substrate, whereby a silicon substrate is made unnecessary to reduce the production cost. Since the thickness of the chip on which the optoelectric converting element is mounted is substantially equal to the depth of an arbitrary layer of the multilayer ceramic substrate on which the chip is mounted, whereby wire bonding can be facilitated to enhance the workability.

DETAILED DESCRIPTION OF THE PREFERRED EMBODIMENTS

Figure 1:
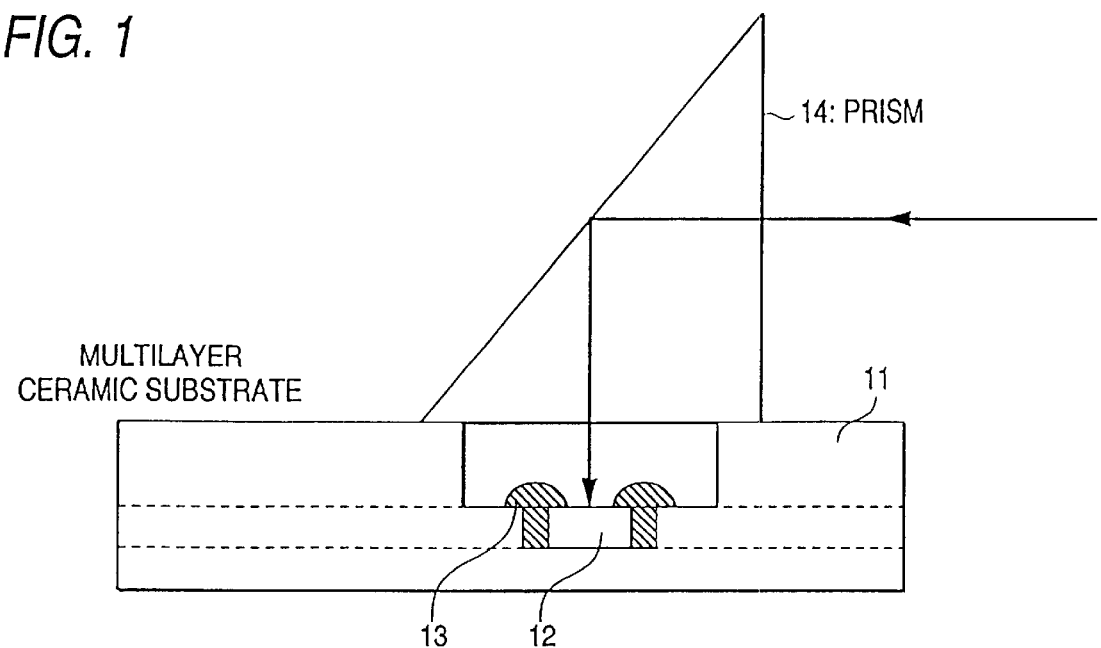
FIG. 1 is a view showing a mounting structure of a hybrid optical module according to the invention.
Figure 2:
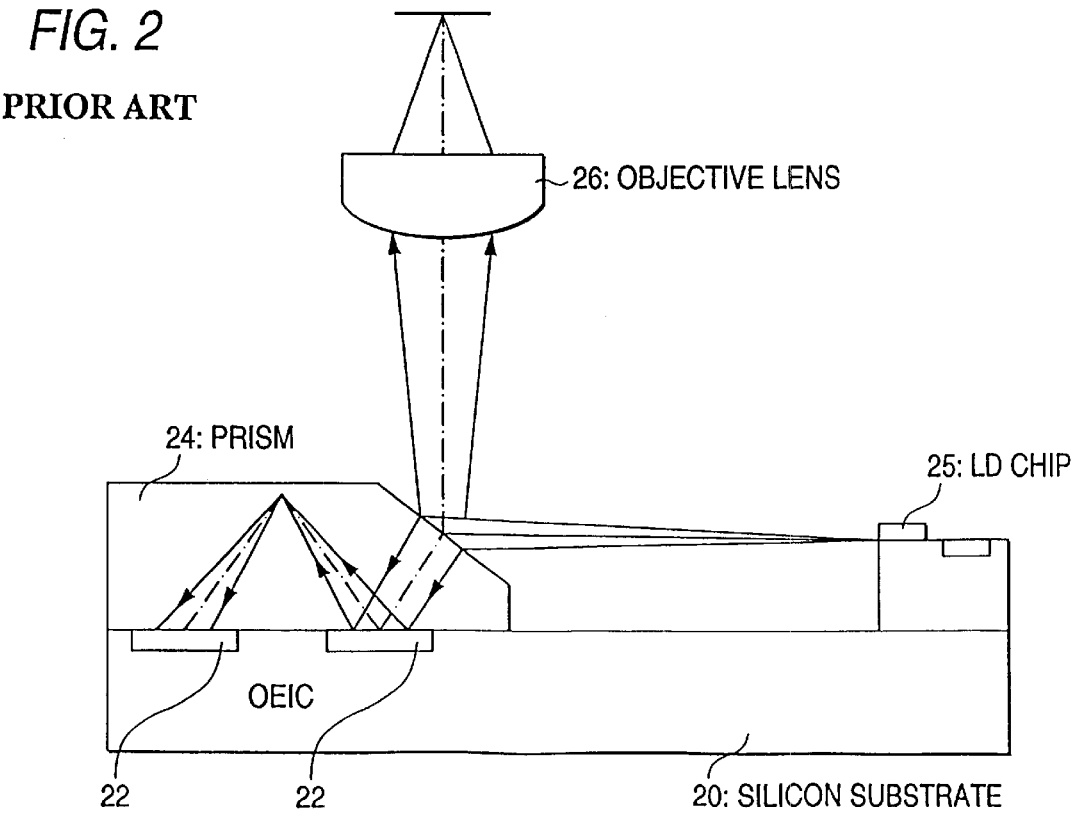
FIG. 2 is a view showing a mounting structure of a hybrid optical module of the conventional art.

FIG. 1 is a view showing main portions of the hybrid optical module of the invention. Referring to the figure, 11 denotes a multilayer ceramic substrate. In the figure, the broken lines indicate plural layers constituting the substrate. The reference numeral 12 denotes a chip on which an optoelectric converting element is mounted (hereinafter, the chip is referred to as OEIC), and which is mounted on the multilayer ceramic substrate 11 by wire bonding 13, and 14 denotes a prism. The prism 14 is mounted on the multilayer ceramic substrate 11, causes light emitted from a laser diode (not shown) to be converged by an objective lens on a signal plane of an optical disk, and receives via the objective lens light which has been modulated in intensity by pits, so that the OEIC 12 detects the light to convert it into an electric signal.

In the multilayer ceramic substrate 11, the depth of the layer on which the OEIC chip 12 is mounted is substantially equal to the thickness of the OEIC chip 12. This configuration is employed in order to improve the workability of a wire bonding process.

In the hybrid optical module, light emitted from the laser diode (not shown) is incident on an end face of the prism 14. The light is then converged by the objective lens which is not shown, on the signal plane of the optical disk. The light is then reflected therefrom with being modulated in intensity by pits, and returns to the prism 14 via the objective lens. The light incident on an end face of the prism 14 is converged on the OEIC chip 12.

As described above, according to the invention, a multilayer ceramic substrate is used, and a prism serving as a component of an optical pickup unit and a chip on which an optoelectric converting element is mounted are mounted on different layers of the multilayer ceramic substrate, whereby a silicon substrate is made unnecessary to reduce the production cost, and the pickup unit can be further miniaturized. Since the thickness of the chip on which the optoelectric converting element is mounted is substantially equal to the depth of the layer of the multilayer ceramic substrate on which the chip is mounted, whereby wire bonding can be facilitated to enhance the workability.

What is claimed is:

1. A hybrid optical module comprising:
  a multilayer ceramic substrate on which an optoelectric converting element is mounted, and
  a prism which controls incidence and emission angles of light is directly mounted on a layer of said multilayer ceramic substrate that is different from the layer on which said optoelectric converting element is mounted,
  wherein said optoelectric converting element is mounted in such a manner that a thickness of said optoelectric converting element is equal to a depth of an arbitrary layer of said multilayer ceramic substrate on which the optoelectric converting element is mounted, and
  said optoelectric converting element is wire-bound to said arbitrary layer.

* * * * *